United States Patent
Jeong et al.

(10) Patent No.: US 10,805,706 B2
(45) Date of Patent: Oct. 13, 2020

(54) BATTERY CHANGEABLE-TYPE EARBUDS AND APPARATUS FOR THE SAME

(71) Applicant: Samsung Electronics Co., Ltd., Suwon-si, Gyeonggi-do (KR)

(72) Inventors: Huisu Jeong, Seongnam-si (KR); Kyounghwan Kim, Seoul (KR); Hwiyeol Park, Hwaseong-si (KR); Jeongkuk Shon, Hwaseong-si (KR); Jaemyung Lee, Seoul (KR); Junhyeong Lee, Seoul (KR); Sungjin Lim, Suwon-si (KR); Jin S. Heo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 43 days.

(21) Appl. No.: 15/974,842

(22) Filed: May 9, 2018

(65) Prior Publication Data
US 2019/0124431 A1 Apr. 25, 2019

(30) Foreign Application Priority Data
Oct. 23, 2017 (KR) .......... 10-2017-0137373

(51) Int. Cl.
*H04R 25/00* (2006.01)
*H04R 1/10* (2006.01)
*H02J 7/00* (2006.01)

(52) U.S. Cl.
CPC .............. *H04R 1/1025* (2013.01); *H02J 7/00* (2013.01); *H04R 1/1016* (2013.01); *H04R 1/1058* (2013.01); *H01M 2220/30* (2013.01)

(58) Field of Classification Search
CPC .............. H01M 2220/30; H02J 7/0052; H02J 2007/0096; H02J 7/0044; H02J 7/0047; H02J 7/025; H02J 7/027; H04R 1/1016; H04R 1/1025; H04R 1/1058; H04R 1/02; H04R 1/1041; H04R 1/1075; H04R 1/2826; H04R 1/2857; H04R 1/345; H04R 2201/105; H04R 2420/07; H04R 2460/03; H04R 2460/09; H04R 2460/17;
(Continued)

(56) References Cited

U.S. PATENT DOCUMENTS 5,631,965 A * 5/1997 Chang ................ A61F 11/08
381/72
6,041,128 A * 3/2000 Narisawa ............ H04R 25/602
381/322

(Continued)

FOREIGN PATENT DOCUMENTS

CN 106331924 A 1/2017
JP 2013255091 A 12/2013
(Continued)

*Primary Examiner* — Phylesha Dabney
(74) *Attorney, Agent, or Firm* — Cantor Colburn LLP

(57) ABSTRACT

A battery changeable-type earbud includes a body from which an acoustic signal is provided to a user, including: a slot with which a battery of the earbud is removably disposed, and an inlet of the slot open at an outer surface of the body and through which the battery is removably disposed with the slot; and an insertion unit protruded from the body, which is insertable to an orifice of the user and through which the acoustic signal is provided from the body of the earbud to the orifice of the user.

17 Claims, 7 Drawing Sheets

(58) Field of Classification Search
CPC .......... H04R 5/033; H04R 9/025; H04R 9/06;
A45C 11/00; A45C 11/24; A45C 13/005;
A45C 13/02; A45C 13/1069; A45C
2011/001; A45C 2013/026; B65D 25/02;
B65D 43/16; F16B 2001/0035; H01R
13/521; H04B 1/385; H04B 1/3888;
H04B 5/0037; H04M 1/6033
USPC .......................................................... 381/384
See application file for complete search history.

(56) References Cited

U.S. PATENT DOCUMENTS

| | | | |
|---|---|---|---|
| 6,359,995 B1* | 3/2002 | Ou | H04R 1/1025 |
| | | | 381/330 |
| 6,549,791 B1 | 4/2003 | Jeon et al. | |
| 10,651,505 B2 | 5/2020 | Jeong et al. | |
| 2004/0264720 A1* | 12/2004 | Huang | H04M 1/05 |
| | | | 381/315 |
| 2005/0116684 A1* | 6/2005 | Kim | B60R 11/0241 |
| | | | 320/114 |
| 2013/0051562 A1* | 2/2013 | Ozawa | H04R 5/00 |
| | | | 381/17 |
| 2013/0148839 A1* | 6/2013 | Stevinson | H04R 1/1033 |
| | | | 381/384 |
| 2016/0302000 A1* | 10/2016 | Shin | H04R 1/1083 |
| 2017/0093079 A1* | 3/2017 | Wagman | H04R 1/1041 |
| 2018/0375092 A1 | 12/2018 | Park et al. | |

FOREIGN PATENT DOCUMENTS

| | | |
|---|---|---|
| KR | 200216321 Y1 | 12/2000 |
| KR | 200255431 Y1 | 11/2001 |
| KR | 1020090132563 A | 12/2009 |
| KR | 1020150102634 A | 9/2015 |
| KR | 1020160041258 A | 4/2016 |
| KR | 1020160103779 A | 9/2016 |

* cited by examiner

BATTERY CHANGEABLE-TYPE EARBUDS AND APPARATUS FOR THE SAME

CROSS-REFERENCE TO RELATED APPLICATION

This application claims priority to Korean Patent Application No. 10-2017-0137373, filed on Oct. 23, 2017, and all the benefits accruing therefrom under 35 U.S.C. § 119, the content of which is incorporated herein in its entirety by reference.

BACKGROUND

1. Field

Provided are earbuds, and more particularly, battery changeable-type earbuds and apparatus for the same.

2. Description of the Related Art

Earbuds include wired earbuds and wireless earbuds. Wired earbuds are widely used. A wired earbud directly receives power from an apparatus connected thereto and receives an acoustic signal through a cable connected between the wired earbud and the apparatus. In the case of a wired earbud, since the apparatus external to the wired earbud is connected to the wired earbud through a cable, there are inconveniences, such as the cable may shake according to a movement of the user and undesirably change the acoustic signal provided to the wired earbud. Additionally, the cable may be undesirably hooked by an object or a person external to the cable.

The inconveniences of the wired earbud may be removed by using a wireless earbud. The wireless earbud generally includes a neck band type or a pair type having individual earbuds separated from each other.

SUMMARY

Exemplary embodiments provide an earbud configured for continuous use by enabling a change of battery while the earbuds are in-use.

Exemplary embodiments further provide apparatuses for use with the earbuds.

Additional features will be set forth in part in the description which follows and, in part, will be apparent from the description, or may be learned by practice of the presented embodiments.

According to an embodiment, an earbud includes: a body from which an acoustic signal is provided to a user, including: a slot with which a battery of the earbud is removably disposed, and an inlet of the slot open at an outer surface of the body and through which the battery is removably disposed with the slot; and an insertion unit protruded from the body, which is insertable to an orifice of the user and through which the acoustic signal is provided from the body of the earbud to the orifice of the user.

The earbud may further include an elastic ring arranged along an inner surface of the slot.

The earbud may further include a contact terminal with which the battery of the earbud is removably connectable, a surface of the contact terminal being exposed to the slot at a location between the inlet of the slot and a bottom of the slot.

The earbud may further include a contact terminal with which the battery of the earbud is removably connectable, a surface of the contact terminal being exposed to the slot at a bottom of the slot located furthest from the inlet thereof.

The body may include a switch with which operation of the earbud is controlled.

The earbud may further include circuit substrates respectively disposed at opposing sides of the slot, the circuit substrates being connected to each other.

A shape of slot may include a main portion having a first width, and a protruded portion extended from the main portion and having a second width smaller than the first width of the main portion.

The elastic ring may be arranged at the inlet of the slot.

The earbud may further include a contact terminal with which the battery of the earbud is removably connectable, a surface of the contact terminal being exposed to the slot, where insertion of the battery into the slot may contact an electrode terminal of the battery to the contact terminal exposed within the slot to provide power from the battery to the earbud.

According to another embodiment, a case for storing and electrically charging an earbud includes: a first groove recessed from a first outer surface of a case body, into which a body of the earbud is removably insertable; a slot recessed from the first outer surface of the case body, into which a battery of the earbud which is separated from the earbud is removably insertable for charging of the battery; and a power supplier having a power capacity larger than that of the battery of the earbud. Insertion of the battery which is separated from the earbud into the slot of the case body connects the battery to the power supplier of the case and charges the battery with power provided from the power supplier.

The case may further include a second groove extended from the first groove along a thickness of the case body in a direction away from the first outer surface of the case body. An acoustic signal provider of the earbud through which an acoustic signal from the body of the earbud is provided to an orifice of a user of the earbud may be protruded from the body of the earbud, and insertion of the body of the earbud into the first groove of the case body may insert the acoustic signal provider of the earbud into the second groove which is extended from the first groove.

The case may further include a through hole extended from the first groove along a thickness of the case body in a direction away from the first outer surface of the case body, the through hole open at a second outer surface of the case body opposite to the first outer surface thereof. An acoustic signal provider of the earbud through which an acoustic signal from the body of the earbud is provided to an orifice of a user of the earbud may be protruded from the body of the earbud, and insertion of the body of the earbud into the first groove may insert the acoustic signal provided of the earbud into the through hole which is extended from the first groove.

According to another embodiment, a mobile apparatus for an earbud includes: an apparatus body in which an acoustic signal is generated and from which the acoustic signal is provided to the earbud, the apparatus body including: a slot recessed from an outer surface of the apparatus body, with which a battery of the earbud which is separated from the earbud is removably disposed for charging of the battery, and a power supplier having a power capacity greater than that of the battery of the earbud. Insertion of the battery which is separated from the earbud into the slot of the apparatus body connects the battery to the power supplier of the mobile apparatus and charges the battery with power provided from the power supplier.

BRIEF DESCRIPTION OF THE DRAWINGS

These and/or other features will become apparent and more readily appreciated from the following description of the exemplary embodiments, taken in conjunction with the accompanying drawings in which.

DETAILED DESCRIPTION

Figure 1A:
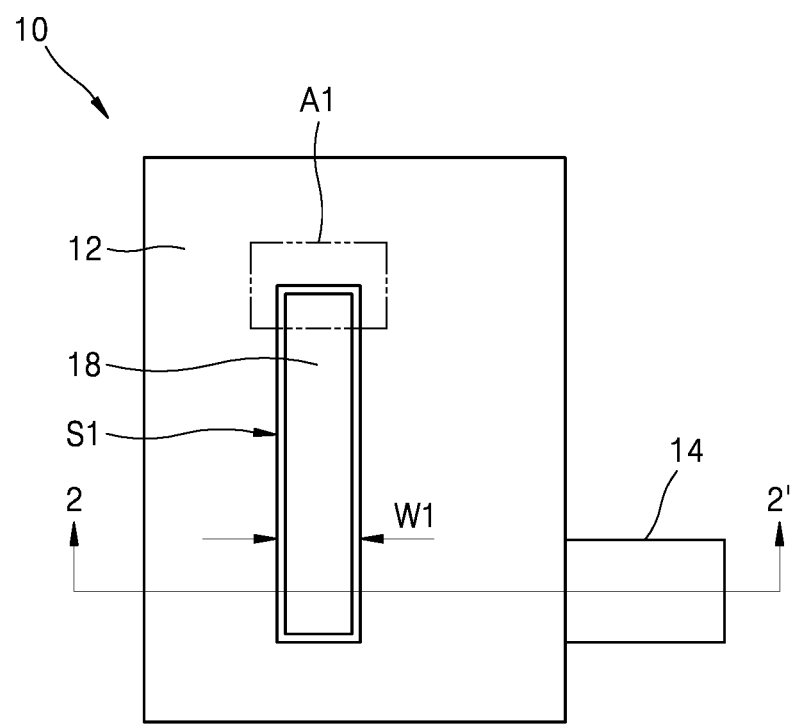
FIG. 1A is a top plan view showing an exemplary embodiment of a battery changeable-type earbud and FIG. 1B is an enlarged top plan view of portion A1 in FIG. 1A, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present. As used herein, when an element is referred to as being "connected" to another element, the elements may be in mechanical, electrical, acoustical and/or fluid connection with each other.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In an earbud of the related art, in particular a wireless earbud, a battery may not be taken out without dismantling the wireless earbud since the battery is mounted at an inner side of the wireless earbud. Accordingly, when the battery is discharged and needs charging, the battery is charged by placing the wireless earbud along with the battery therein on a charger. Thus, the wireless earbud may not be used while the battery is being charged.

A battery changeable-type earbud according to an exemplary embodiment at least eases the inconvenience of the wireless earbud of the related art which is unusable during charging of the battery thereof.

Hereinafter, battery changeable-type earbuds according to an exemplary embodiment and an apparatus for the battery changeable-type earbuds will now be described in detail with reference to the accompanying drawings. In the drawings, thicknesses of layers or regions are exaggerated for clarity of specification.

Figure 1B:
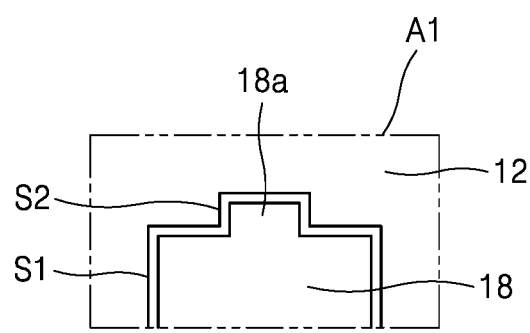

FIG. 1A is a top plan view showing an exemplary embodiment of a battery changeable-type earbud 10 and FIG. 1B is an enlarged top plan view of first region A1 in FIG. 1A, according to the invention.

Referring to FIG. 1, the battery changeable-type earbud 10 according to an exemplary embodiment includes a body 12 and an insertion unit 14 which is connected to the body 12. The body 12 includes a circuit substrate that supports and controls an operation of the battery changeable-type earbud 10. The insertion unit 14 is a portion of the battery changeable-type earbud 10 which is insertable into an ear of the user which receives an acoustic signal, such as an ear of the user. The acoustic signal may be transferred from the body 12 to an orifice (e.g., ear) through or at the insertion unit 14. The insertion unit 14 may be connected to the body 12 to receive the acoustic signal therefrom. The body 12 may remain at the orifice along with the insertion unit 14, during use of the battery changeable-type earbud 10.

The body 12 includes a slot S1. A battery 18 is insertable into and removable from the slot S1. The battery 18 may be a rechargeable secondary battery that may be repeatedly charged, without being limited thereto. The battery 18 may be a primary battery for supplying power suitable for operating the battery changeable-type earbud 10, according to a specification thereof.

A main portion of the slot S1 may have a rectangular shape in the top plan and cross-sectional views. However, as depicted in the enlarged cross-sectional view of the first region A1 FIG. 1B, a protruding slot (portion) S2 may further be provided extended from a side of the main portion of the slot S1. The protruding slot S2 may be a protruded portion of the slot S1 so as to be continuous therewith and form a single, unitary slot (S1+S2).

The battery changeable-type earbud 10 and components thereof may be disposed in a plane defined by first and second directions crossing each other. In FIGS. 1A and 1B, the horizontal and vertical directions may defined the first and second directions, or vice versa. A thickness of the battery changeable-type earbud 10 and components thereof is taken in a third direction crossing each of the first and second directions. In FIGS. 1A and 1B, the thickness direction may be extended into the page or view.

A width W1 of the slot S1 may be a maximum dimension of the slot S1 along the horizontal direction in FIGS. 1A and 1B. The protruding slot S2 may have or define a width less than the width W1 of the slot S1. A length of the slot S1 may be a maximum dimension of the slot S11 along the vertical direction in FIGS. 1A and 1B. A length of the protruding slot S2 is less than a length of the slot S1. The protruding slot S2 is protruded from the slot S1 at a first side thereof, in FIG. 1A. A protruding slot S2 may also be provided protruding from the slot S1 at a second side thereof opposite to the first side of the slot S1. That is, the protruding slot S2 may be provided in plurality respectively extending from opposing sides of the slot S1.

When the battery changeable-type earbud 10 includes the protruding slot S2, the battery 18 may also have a portion 18a protruded from a main portion of the battery 18 and extending into the protruding slot S2. A planar shape of the protruding slot S2 may correspond to that of the portion 18a of the battery 18. The protruding slot S2 may increase stability in a process of inserting the battery 18 into the slot S1.

Figure 2:
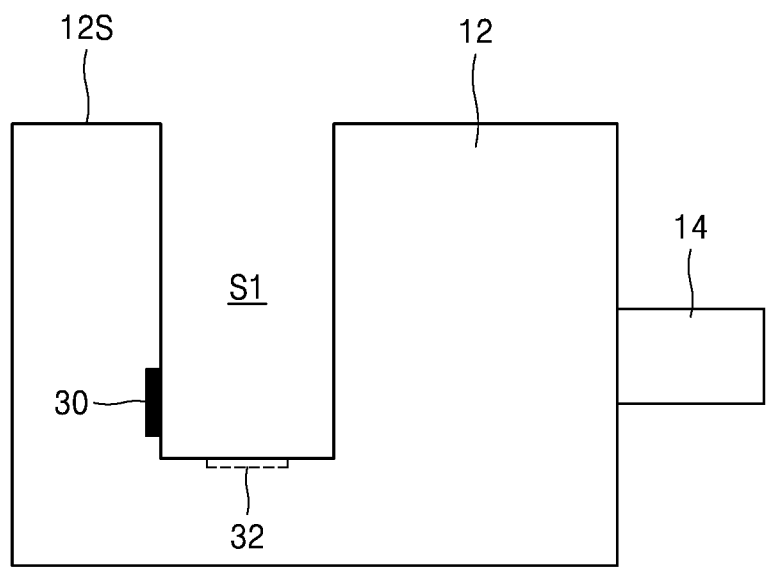
FIG. 2 is a cross-sectional view taken along line 2-2' of FIG. 1A.

FIG. 2 is a cross-sectional view taken along line 2-2' of FIG. 1.

Referring to FIG. 2, the slot S1 is inwardly disposed or recessed from an upper surface 12S of the body 12 by a given depth along the thickness direction. The slot S1 may have a depth equal to or greater than a total length of the battery 18 which extends in the thickness direction. An inlet of the slot S1 is open to outside the body.

A battery contact terminal 30 is disposed or formed at an inner (side) surface of the slot S1. The battery contact terminal 30 may be arranged such that a portion thereof is extended from an inner surface of the body 12 at the slot S1 to be buried within the body 12. A surface of the battery contact terminal 30 is exposed to outside the body 12 at the slot S1 therein. The surface of the battery contact terminal 30 may be coplanar with the inner surface of the body 12. The battery contact terminal 30 may be arranged close to a bottom of the slot S1 with respect to the upper surface 12S of the body. An electrode terminal of the battery 18 may contact the battery contact terminal 30 when the battery 18 is disposed within the slot S1.

In addition to or alternative to the battery contact terminal 30 discussed above, a battery contact terminal 32 may be arranged, as depicted by a dashed line in FIG. 2, at the bottom of the slot S1, not at the inner side surface of the slot S1. When the battery contact terminal 32 is arranged on the bottom of the slot S1, the battery contact terminal 32 may be arranged such that a portion of the battery contact terminal 32 may be buried within the body 12 at the bottom of the slot S1.

Figure 3:
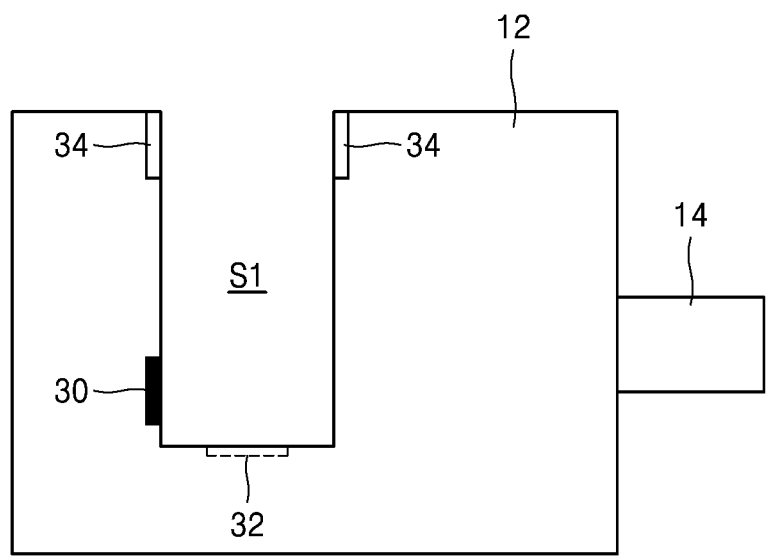
FIG. 3 is a cross-sectional view showing a modified exemplary embodiment of a battery changeable-type earbud shown in FIG. 2, according to the invention.

As depicted in FIG. 3, a ring 34 including an elastic material for sealing the slot S1 may be provided at a portion of the inner surface of the slot S1. The ring 34 surrounds the battery 18 which is inserted in the slot S1 and is in contact with an outer surface of the battery 18 to seal the slot S1. The ring 34 may be arranged at the inner surface adjacent to an inlet of the slot S1 at the upper surface 12S thereof. However, the location of the ring 34 is not limited thereto. The ring 34 may be arranged between the inlet of the slot S1 and the battery contact terminal 30 or 32 along a depth of the slot S1. The ring 34 is spaced apart from and not in contact with the battery contact terminal 30 or 32.

Since the ring 34 disposed in the slot S1 is in contact with the battery 18, sealing may be achieved between the ring 34 and the battery 18. Accordingly, the slot S1 is not exposed to outside the battery changeable-type earbud 10 and the battery changeable-type earbud 10 may have a water proof function.

Figure 4:
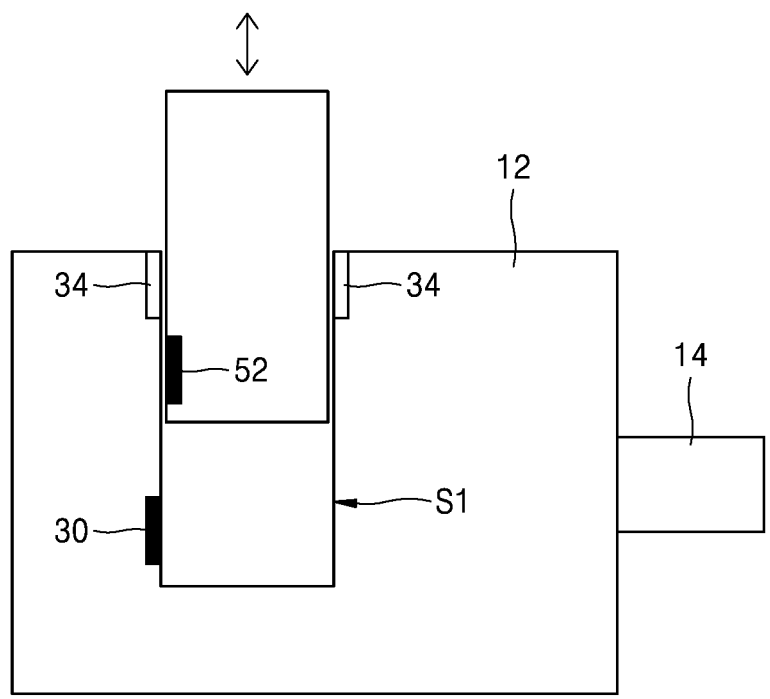
FIGS. 4 and 5 are cross-sectional views showing an exemplary embodiment of processes in a method of mounting a battery in the battery changeable-type earbud shown in FIG. 3, according to the invention.
Figure 5:
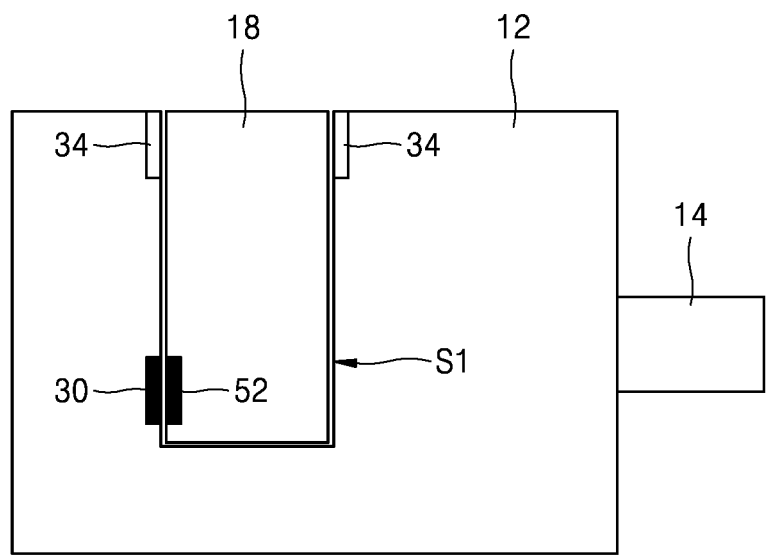

FIGS. 4 and 5 are cross-sectional views showing exemplary embodiments of processes in a method of inserting and mounting the battery 18 in the battery changeable-type earbud 10 of FIG. 3, by using a sliding method (indicate by double-headed arrow), according to the invention.

Referring to FIG. 4, a portion of the battery 18 is inserted into the slot S1. The battery 18 may be mounted into or separated from the battery changeable-type earbud 10 through the slot S1. The battery 18 of which a portion is disposed in the slot S1 contacts the ring 34 exposed at an inner area of the slot S1. In the battery 18, an electrode terminal 52 of the battery 18 may be arranged at a location corresponding to the battery contact terminal 30 or 32. While the battery 18 is inserted in the slot S1 by a sliding method, the battery 18 and the ring 34 may remain in a contact state. Accordingly, the sealing of the slot S1 may be maintained while the battery 18 is being inserted into the slot S1. Thus, entry of external moisture or contaminants into the slot S1 during coupling of the battery 18 to the body 12 is reduced or effectively prevented.

FIG. 5 shows a completely inserted battery 18 relative to the slot S1 of the body 12.

Referring to FIG. 5, when the battery 18 is completely mounted within the body 12, the electrode terminal 52 of the battery 18 and the battery contact terminal 30 arranged at an inner side surface of the slot S1 directly contact each other.

The process of inserting and mounting of the battery 18 of FIGS. 4 and 5 may also be equally applied to the battery changeable-type earbud 10 of FIG. 2 or to the battery changeable-type earbud 10 including the battery contact terminal 32.

For fixing and releasing of the battery 18 relative to the slot S1 by a sliding method, a general method, such as a toggle method may be applied.

Figure 6:
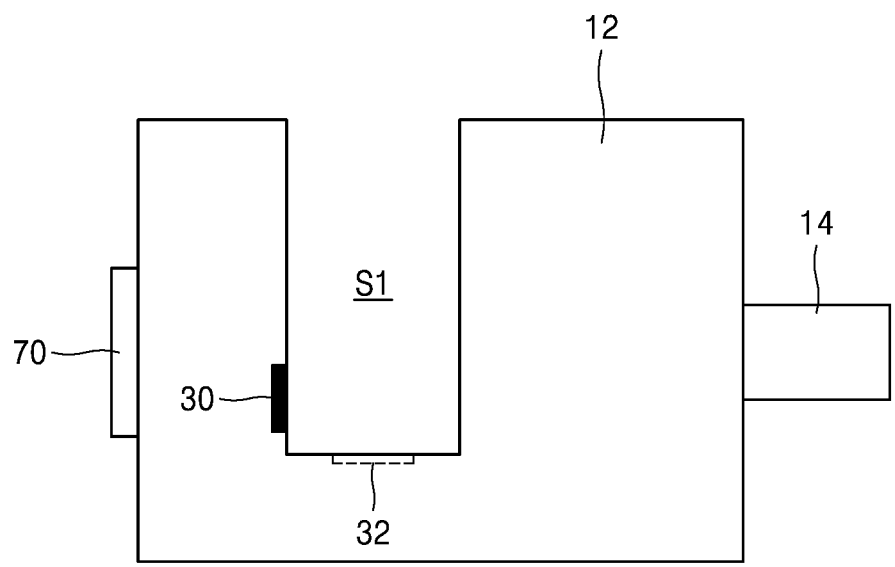
FIG. 6 is a cross-sectional view showing another exemplary embodiment of a battery changeable-type earbud shown in FIG. 2, including an operation button, according to the invention.

FIG. 6 is a cross-sectional view showing another exemplary embodiment of a battery changeable-type earbud shown in FIG. 2, including an operation button 70, according to the invention.

Referring to FIG. 6, the operation button 70 is arranged on a surface of the body 12 which opposes the insertion unit 14. The operation button 70 may be a switch that performs an on/off function of the battery changeable-type earbud 10. Pressing of the operation button 70 actuates the operation button 70 and switches operation of the battery changeable-type earbud 10 between an on-state and an off-state. In an exemplary embodiment, when the operation button 70 is pressed once, the battery changeable-type earbud 10 is operated, and when the operation button 70 is pressed once again, the operation of the battery changeable-type earbud 10 is stopped.

Figure 7:
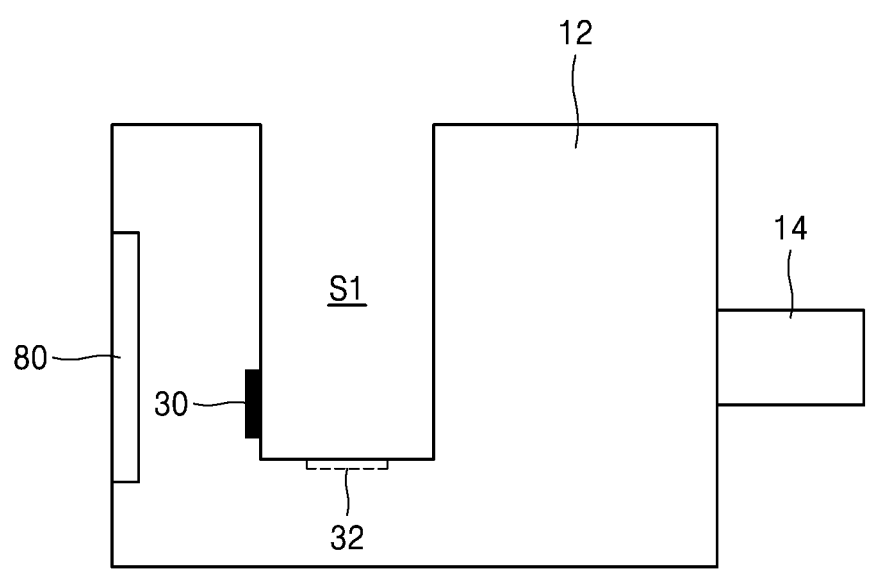
FIG. 7 is a cross-sectional view showing still another exemplary embodiment of a battery changeable-type earbud shown in FIG. 2, including a touch sensor, according to the invention.

Instead of the mechanically-actuated operation button 70, as depicted in FIG. 7, a touch sensor 80 may be included in the battery changeable-type earbud 10. The arrangement location of the touch sensor 80 may be the same as the location of the operation button 70. However, the touch sensor 80 may be arranged at another location considering the convenience of the user. In an exemplary embodiment, operation of the touch sensor 80 such as by applying a contact or touch thereto switches a function or operation of the battery changeable-type earbud 10 between and on-state and an off-state.

Figure 8:
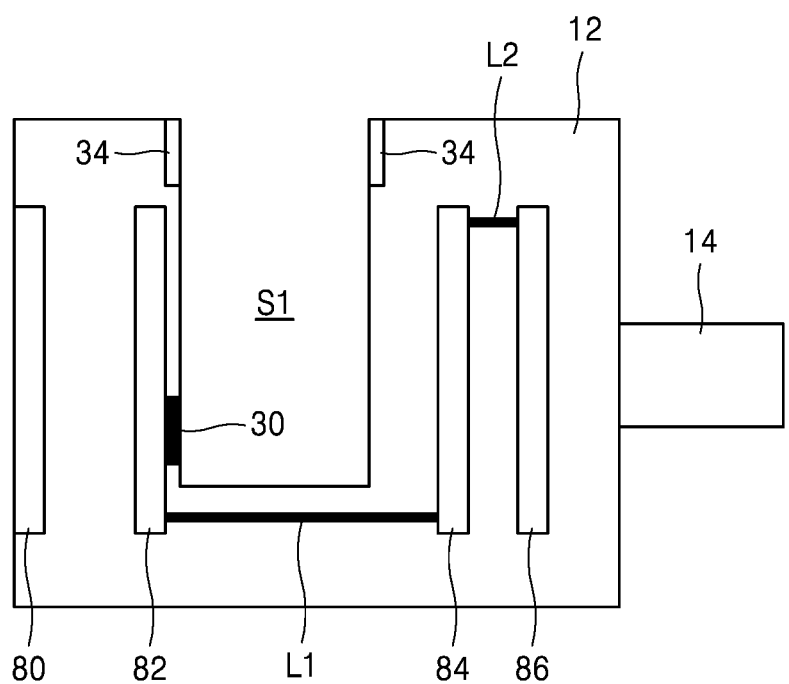
FIG. 8 is a cross-sectional view showing an example of an inner configuration of a battery changeable-type earbud, according to the invention.

FIG. 8 is a cross-sectional view of an example of a configuration of a circuit substrate in the body 12 of the battery changeable-type earbud 10. The configuration may also be applied to the battery changeable-type earbud 10 of FIGS. 2, 3 and 6.

Referring to FIG. 8, a first circuit substrate 82 is arranged between the touch sensor 80 and the slot S1. The first circuit substrate 82 contacts or is connected to the battery contact terminal 30 exposed at the slot S1. Second and third circuit substrates 84 and 86 are arranged between the slot S1 and the insertion unit 14. The first circuit substrate 82 and the second circuit substrate 84 are connected to each other via a wire L1, and the second circuit substrate 84 and the third circuit substrate 86 are connected to each other via a wire L2. The first through third circuit substrates 82, 84 and 86 may include circuits and conductive members with which various functions of the battery changeable-earbud 10 are performed and/or controlled. The first through third circuit substrates 82, 84 and 86 may be or may not be parallel to each other. The number of circuit substrates within the body 12 may not be limited to three circuit substrates.

Although not shown, the touch sensor 80 and the insertion unit 14 may be electrically connected to one or more of the first through third circuit substrates 82, 84 and 86. An electrical component included in the touch sensor 80 and a micro-speaker component included in the insertion unit 14 may be electrically connected to one or more of the first through third circuit substrates 82, 84 and 86. In an exemplary embodiment, for example, the electrical component included in the first circuit substrate 82 within the body 12 and the micro-speaker component included in the insertion unit 14 may each be electrically connected to the third circuit substrate 86.

Figure 9:
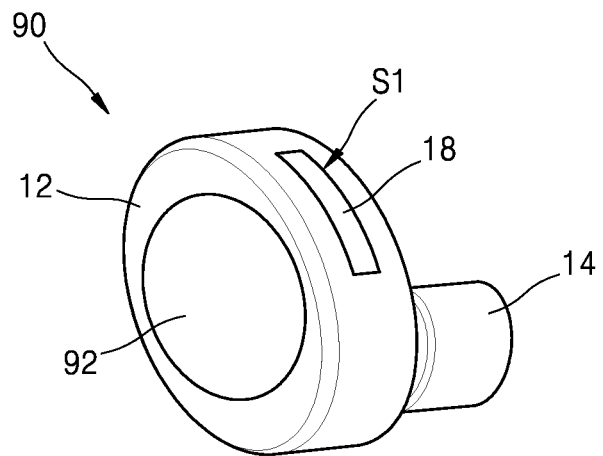
FIG. 9 is a perspective view showing an exemplary embodiment of a battery changeable-type wireless earbud, according to the invention.

FIG. 9 is a perspective view showing an exemplary embodiment of a battery changeable-type wireless earbud 90, according to the invention.

The battery changeable-type wireless earbud 90 may be one of the battery changeable-type earbuds 10 described above such that characteristics disclosed within FIGS. 1-8 are applicable to the battery changeable-type wireless earbud 90 in FIG. 9. The reference numeral 92 indicates a switch with which an operation of the battery changeable-type wireless earbud 90 is performed or controlled. The switch 92 may be one of the operation button 70 of FIG. 6, the touch sensor 80 of FIG. 7, and another functional and/or operational element. The switch 92 is exposed to outside the battery changeable-type wireless earbud 90 so as to be accessible from outside thereof.

Figure 10:
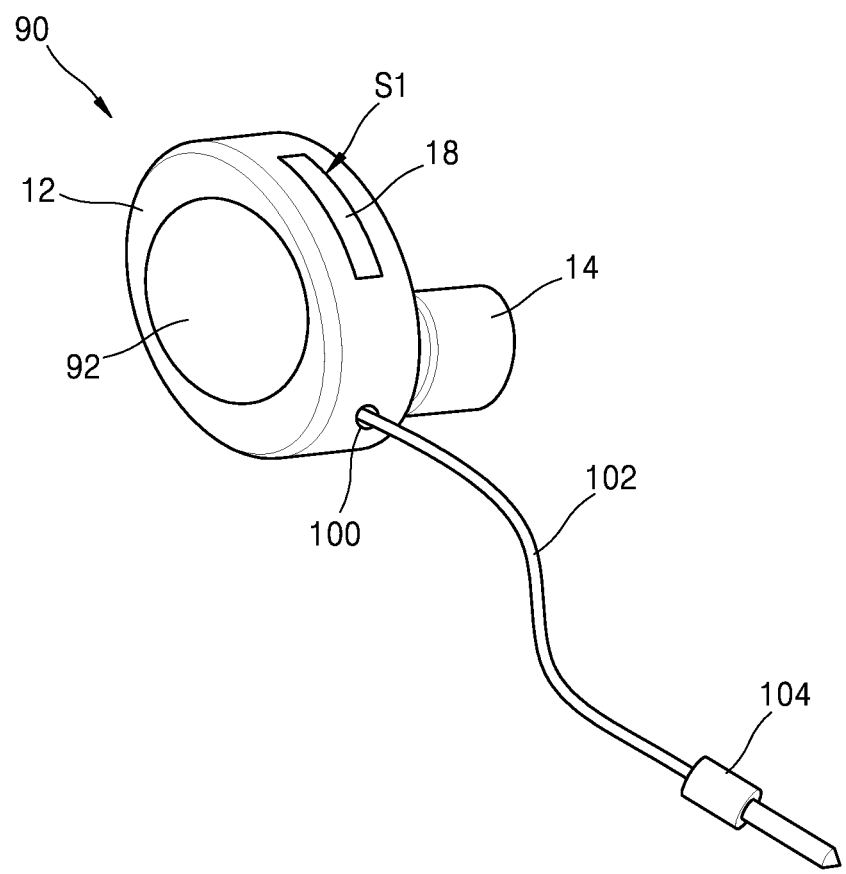
FIG. 10 is a perspective view showing an exemplary embodiment of a battery changeable-type wire/wireless earbud, according to the invention.

The battery changeable-type wireless earbud 90 of FIG. 9, as modified and depicted in FIG. 10, may be used as a wire/wireless earbud by further including a connection cable 102. The connection cable 102 connects the battery changeable-type wireless earbud 90 to an external device (not shown) which generates and/or provides an acoustic signal to the battery changeable-type wireless earbud 90. The external device may be a device that provides acoustic information and/or acoustic signals to be heard through the battery changeable-type wireless earbud 90 depicted in FIG. 9 and FIG. 10, for example, a mobile apparatus or a radio.

A first end of the cable 102 is connected to the battery changeable-type wireless earbud 90. A jack 104 is connected to a second (distal) end of the cable 102 which opposes the first end thereof. The jack 104 is inserted into an inserting hole provided in the external device. The battery changeable-type wireless earbud 90 includes a groove 100 in the body 12 where the first end of the cable 102 is connected to the body 12.

The cable 102 may be permanently connected to the body 12 through the groove 100. However, the first end of the cable 102 may be removably insertable into the groove 100 by providing a jack similar to that provided at the second end of the cable 102 for removable insertion to the external device. In the latter case, the cable 102 may be separated from both the battery changeable-type wireless earbud 90 and the external device. Therefore, when the cable 102 is unnecessary like during use of the battery changeable-type wireless earbud 90 outdoors, the battery changeable-type wireless earbud 90 may be used as a wireless earbud that does not use the cable 102.

In the case of use of the battery changeable-type wireless earbud 90 indoors, the battery changeable-type wireless earbud 90 may be used as a wired earbud by using the cable 102. Where the battery changeable-type wireless earbud 90 may be used as a wired earbud, power may be provided thereto through the cable 102 while the battery 18 is separated from the wired earbud. Thus, the battery 18 may be maintained in a charging state when the battery changeable-type wireless earbud 90 is used indoors as a wired earbud.

The battery changeable-type wireless earbud 90 described above is one of two earbuds that form a pair, for example, an earbud for a left ear of the user. The configuration of an earbud for the right ear may be the same as that of the earbud for the left ear.

Figure 11:
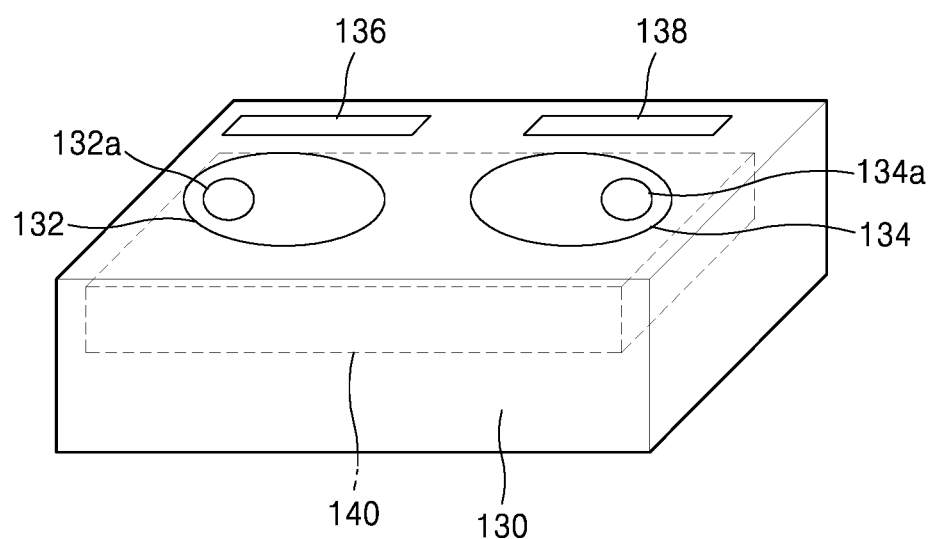
FIG. 11 is a perspective view showing an exemplary embodiment of a case in which a battery changeable-type earbud is stored and electrically charged, according to the invention.

FIG. 11 is a perspective view showing an exemplary embodiment of a case in which a battery changeable-type earbud is stored and charged, according to the invention.

Referring to FIG. 11, first and second grooves 132 and 134 are disposed or recessed from an upper surface of a case body 130. Battery changeable-type earbuds respectively are placed in the first and second grooves 132 and 134. A third groove 132a having a depth greater than that of the first groove 132 is disposed recessed from a bottom of the first groove 132. A fourth groove 134a having a depth greater than that of the second groove 134 is disposed recessed from a bottom of the second groove 134.

The third and fourth grooves 132a and 134a may be grooves into which the insertion units 14 of the battery changeable-type earbuds are inserted. The third and fourth groves 132a and 134a may be through holes which are open at the first and second grooves 132 and 134 and at a lower surface of the case body 130. That is, a collective groove (132+132a or 134+134a) may be defined extended through an entirety of the thickness of the case body 130 to define a through hole.

First and second slots 136 and 138 are disposed or recessed from the upper surface of the case body 130. The first and second slots 136 and 138 respectively may be arranged to adjacently correspond to the first and second grooves 132 and 134. The first and second slots 136 and 138 are slots for charging batteries received therein. While storing the earbuds in the first and second grooves 132 and 134 of the case body 130, batteries of the earbuds may be inserted into and charged in the first and second slots 136 and 138. A relatively large capacity power supplier 140 is arranged in the case body 130. Batteries inserted in the first and second slots 136 and 138 may be charged by the relatively large capacity power supplier 140. Batteries inserted in the first and second slots 136 and 138 may be connected the relatively large capacity power supplier 140 to be charged thereby. The large capacity power supplier 140 may be, for example, a relatively large capacity battery having a capacity corresponding to a few times greater than that of the batteries used in the battery changeable-type earbuds.

Figure 12:
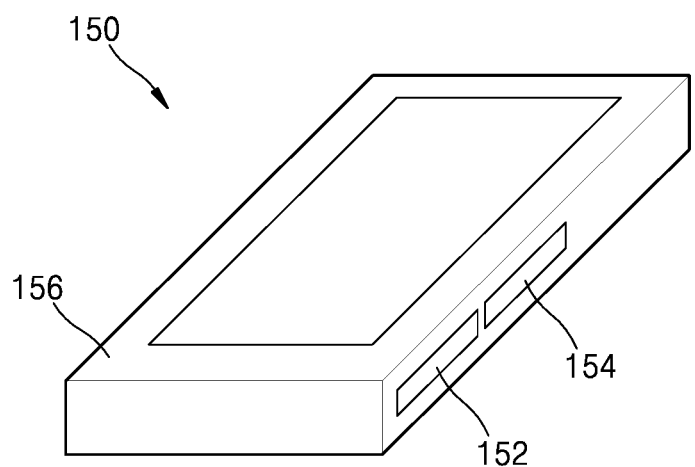
FIG. 12 is a perspective view showing an exemplary embodiment of a mobile apparatus to which a battery change-able type earbud is connectable, according to the invention.

FIG. 12 is a perspective view showing an exemplary embodiment of a mobile apparatus 150 to which a battery changeable-type earbud is connectable, according to the invention.

Referring to FIG. 12, the mobile apparatus 150 to which a battery changeable-type earbud may be connectable, may include a mobile apparatus optimized to the battery changeable-type earbuds according to one or more exemplary embodiments described above. The mobile apparatus 150 may be a mobile phone without being limited thereto.

The mobile apparatus 150 may include a body 156 at which at least an acoustic signal or acoustic information is generated, and first and second slots 152 and 154 which are provided at a side of the body 156. The first and second slots 152 and 154 are slots for charging batteries of one or more exemplary embodiment of the battery changeable-type earbuds described above. Charging power for the batteries inserted into the first and second slots 152 and 154 may be supplied from a power source (not shown) of the mobile apparatus 150.

One or more exemplary embodiment of the battery changeable-type wireless earbud according to the invention includes a slot and/or a space in which a battery is removable disposed. An inlet of the slot or space is disposed recessed from an outer surface of the battery changeable-type wireless earbud. The battery is removably insertable in the slot and is coupled to or removed from the battery changeable-type wireless earbud by being slidably disposed with the body of the battery changeable-type wireless earbud through the inlet thereof. The battery inserted into the slot or space may be removed therefrom such as by pressing a toggle or release once. A generally known method besides a toggle method may be applied to perform the mounting and removing of the battery to and from the battery changeable-type wireless earbud.

In a wireless earbud of the related art, a battery is fixedly mounted and built into the wireless earbud. Thus, when the battery is fully discharged, the wireless earbud may be used after the battery is charged by inserting a portion of the wireless earbud in a charger. Therefore, the wireless earbud connected to a charger may not be continuously used.

However, in one or more exemplary embodiment of the battery changeable-type earbud according to the invention, the battery changeable-type earbud may be continuously used even during charging of the battery by simply replacing a discharged battery with a fully-charged battery.

While one or more embodiments have been described with reference to the figures, it will be understood by those of ordinary skill in the art that various changes in form and details may be made therein without departing from the spirit and scope as defined by the following claims.

What is claimed is:

1. An earbud comprising:
a body through which an acoustic signal is provided to a user, comprising:
a slot with which a battery of the earbud is removably disposed, and
an inlet of the slot open at an outer surface of the body and through which the battery is removably disposed with the slot; and
an insertion unit protruded from the body, which is insertable to an ear of the user and through which the acoustic signal is provided from the body of the earbud to the orifice of the user,
wherein the inlet of the slot is always opened and the battery is directly inserted in the slot.

2. The earbud of claim 1, further comprising within the slot of the body, an elastic ring arranged along an inner side surface of the body at the slot.

3. The earbud of claim 2, wherein the elastic ring within the slot of the body is arranged at the inlet of the slot.

4. The earbud of claim 1, further comprising within the slot of the body, a contact terminal with which the battery of the earbud is removably connectable, a surface of the contact terminal being exposed to the slot at a location between the inlet of the slot and a bottom of the slot.

5. The earbud of claim 1, further comprising within the slot of the body, a contact terminal with which the battery of the earbud is removably connectable, a surface of the contact terminal being exposed to the slot at a bottom of the slot located furthest from the inlet thereof.

6. The earbud of claim 1, wherein the body further comprises a switch with which operation of the earbud is controlled.

7. The earbud of claim 6, wherein the switch with which the operation of the earbud is controlled comprises a touch sensor which senses an external contact thereto or a mechanical button which is mechanically actuated.

8. The earbud of claim 1, further comprising within the body of the earbud, circuit substrates respectively disposed at opposing sides of the slot, the circuit substrates being connected to each other.

9. The earbud of claim 1, wherein a shape of the slot comprises:
   a main portion having a first width, and
   a protruded portion extended from the main portion and having a second width smaller than the first width of the main portion.

10. The earbud of claim 1, further comprising within the slot of the body, a contact terminal with which the battery of the earbud is removably connectable, a surface of the contact terminal being exposed to the slot,
    wherein insertion of the battery into the slot contacts an electrode terminal of the battery to the contact terminal exposed within the slot to provide power from the battery to the earbud.

11. The earbud of claim 1, further comprising a wire protruded from the body, with which the earbud is removably connectable to a mobile apparatus in which the acoustic signal is generated and from which the acoustic signal is provided to the body of the earbud,
    wherein
    the mobile apparatus includes a power supplier which provides electrical power,
    removal of the battery of the earbud from the slot thereof removes electrical power to the earbud which is provided from the battery, and
    connection of the wire of the earbud to the mobile apparatus provides the electrical power from the power supplier to the earbud.

12. A case for storing and electrically charging an earbud, the case comprising:
    a first groove recessed from a first outer surface of a case body, into which a body of the earbud is removably insertable;
    a slot recessed from the first outer surface of the case body, into which a battery of the earbud which is separated from the earbud is removably insertable for charging of the battery; and
    a power supplier having a power capacity larger than that of the battery of the earbud,
    wherein insertion of the battery separated from the earbud into the slot of the case body connects the battery to the power supplier of the case and charges the battery with power provided from the power supplier.

13. The case of claim 12, further comprising a second groove extended from the first groove along a thickness of the case body in a direction away from the first outer surface of the case body,
    wherein
    an insertion unit of the earbud through which an acoustic signal from the body of the earbud is provided to an ear of a user of the earbud is protruded from the body of the earbud, and
    insertion of the body of the earbud into the first groove of the case body inserts the insertion unit of the earbud into the second groove which is extended from the first groove.

14. The case of claim 12, further comprising a through hole extended from the first groove along a thickness of the case body in a direction away from the first outer surface of the case body, the through hole open at a second outer surface of the case body opposite to the first outer surface thereof,
    wherein
    an insertion unit of the earbud through which an acoustic signal from the body of the earbud is provided to an ear of a user of the earbud is protruded from the body of the earbud, and
    insertion of the body of the earbud into the first groove inserts the acoustic signal provided of the earbud into the through hole which is extended from the first groove.

15. The case of claim 12, wherein
    the first groove is provided in plurality, each recessed from the first outer surface of the case body, bodies of a first earbud and a second earbud being removably insertable into the first grooves, respectively, and
    the slot is provided in plurality, each recessed from the first outer surface of the case body, a battery of the first earbud which is separated from the first earbud and a battery of the second earbud which is separated from the second earbud being removably insertable into the slots of the case for charging the batteries, respectively.

16. A mobile apparatus for an earbud, the mobile apparatus comprising:
    an apparatus body in which an acoustic signal is generated and from which the acoustic signal is provided to the earbud, the apparatus body comprising:
    a slot recessed from an outer surface of the apparatus body, with which a battery of the earbud which is separated from the earbud is removably disposed for charging of the battery, and
    a power supplier having a power capacity greater than that of the battery of the earbud,
    wherein insertion of the battery which is separated from the earbud into the slot of the apparatus body connects the battery to the power supplier of the mobile apparatus and charges the battery with power provided from the power supplier.

17. The mobile apparatus of claim 16, wherein the slot is provided in plurality, each recessed from the outer surface of the apparatus, a battery of a first earbud which is separated from the first earbud and a battery of a second earbud which is separated from the second earbud being removably insertable into the slots of the mobile apparatus for charging the batteries, respectively.

* * * * *